US008209420B2

United States Patent
Moonen

(10) Patent No.: US 8,209,420 B2
(45) Date of Patent: Jun. 26, 2012

(54) MANAGEMENT OF DUPLICATE TCP CONNECTIONS USING SEQUENCE AND ACKNOWLEDGMENT NUMBERS

(75) Inventor: Scott C. Moonen, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 12/141,117

(22) Filed: Jun. 18, 2008

(65) Prior Publication Data

US 2009/0319665 A1    Dec. 24, 2009

(51) Int. Cl.
*G06F 15/16* (2006.01)

(52) U.S. Cl. .................. 709/227; 709/229; 709/220

(58) Field of Classification Search .............. 709/227
See application file for complete search history.

(56) References Cited

U.S. PATENT DOCUMENTS

| 2001/0056492 A1* | 12/2001 | Bressoud et al. | 709/227 |
| 2005/0216954 A1* | 9/2005 | Ramaiah et al. | 726/22 |
| 2007/0255861 A1* | 11/2007 | Kain et al. | 710/8 |

* cited by examiner

*Primary Examiner* — Wing F. Chan
*Assistant Examiner* — Andrew Woo
(74) *Attorney, Agent, or Firm* — Steven M. Greenberg, Esq.; Carey, Rodriguez, Greenberg & O'Keefe

(57) ABSTRACT

A method for managing a first TCP connection with a second computer is disclosed. The method can include associating the first TCP connection with a first set of numbers. The method can further include receiving a SYN message from an unidentified computer, wherein the SYN message is associated with a second set. The method can further include creating a record representing a new TCP connection with the unidentified computer, wherein the new TCP connection is associated with the second set, sending a SYN/ACK message to the second computer and receiving an ACK message from the second computer, wherein the ACK message is associated with a third set. The method can further include verifying the first TCP connection and deleting the record if the third set matches the first set. Alternatively, if the third set matches the second set, then the first TCP connection is replaced with the new TCP connection.

7 Claims, 2 Drawing Sheets

MANAGEMENT OF DUPLICATE TCP CONNECTIONS USING SEQUENCE AND ACKNOWLEDGMENT NUMBERS

BACKGROUND OF THE INVENTION

1. Field of the Invention

The present invention relates to the field of network communications and more particularly to network communications that involve TCP connections between two computing entities.

2. Description of the Related Art

The world wide web is currently the premier computer network for communicating both private and public information. The web is an open network that primarily uses a protocol called TCP/IP (Transmission Control Protocol/Internet Protocol). TCP/IP is the set of communications protocols that implement the protocol stack on which the web and most commercial networks run. One of the basic functions of the TCP/IP protocol is the ability to provide two computing entities with a TCP connection whereby data is exchanged in a duplex manner. Problems may arise, however, during the management of TCP connections between two computing entities, also referred to as "peers."

Consider a TCP connection between a first and a second computer, wherein the TCP connection exists in an ESTABLISHED state. TCP connections can exist in various predefined states such as the ESTABLISHED state for a well-established TCP connection, the LISTEN state for a TCP connection that is in the process of forming and the CLOSE state for a TCP connection that has been closed. If the second computer, or peer, is rebooted unexpectedly, the TCP connection may remain in an ESTABLISHED state provided the local connection endpoint does not send any data. After reboot, the second computer, or peer, may initiate a new TCP connection with the first computer reusing the same four-tuple. A TCP packet has a Source Address (SA), Destination Address (DA), Source Port (SP), and Destination Port (DP). The set of values SA, SP, DA, DP of a packet is called the four-tuple of the packet. The only existing method that allows the first computer to recognize that the original TCP connection has become stale and must be terminated is to send periodic "keepalive" test packets on that connection. However, the use of "keepalive" packets contributes to network congestion and can raise network costs. Further, because the first computer cannot detect a stale TCP connection, the first computer may become vulnerable to attack via the already existing TCP connection.

A TCP connection is established via a three-way handshake wherein a first computer sends a SYN (or synchronize) packet to the second computer, which responds by sending back a SYN-ACK (or synchronize acknowledge) packet. A SYN packet includes unique sequence and acknowledgement numbers. The handshake ends when the first computer sends an ACK (or acknowledge) packet to the second computer. An RST (or reset) packet can reset a TCP connection.

If a TCP connection between a first and second computer goes stale, the first computer may receive a new SYN message. One approach to the problem defined above involves the first computer sending an RST packet to the second computer including sequence and acknowledgement numbers that match the new SYN. This terminates the new connection with the second computer but the old connection is never terminated. As such, no new connection is able to reuse the original four-tuple. This may cause processing overhead which is not desirable.

Another approach to the problem defined above involves the first computer sending to the second computer an RST packet with sequence and acknowledgement numbers that match the original TCP connection. This exposes the first computer to attack from an attacker who knows or is able to guess the original TCP connection's four-tuple. Using this information, an attacker can coax the first computer into thinking that the attacker is actually the second computer, thereby gaining trusted status with the first computer and ultimately causing the closure of an existing valid TCP connection. This is unacceptable from a security standpoint.

A final approach to this problem involves the first computer sending to the second computer an ACK packet having sequence and acknowledgement numbers that match the old connection. The TCP standards, however, do not permit the second computer to respond to the unexpected sequence and acknowledgement numbers with a RST packet, so this approach will not allow the old connection to be terminated or the new connection to be established. Thus, no new connection is able to reuse the four-tuple of the original TCP connection.

Therefore, there is a need to overcome the deficiencies with the prior art and more particularly for a more efficient way to detect and correct for the reboot of a peer on a TCP connection.

BRIEF SUMMARY OF THE INVENTION

Embodiments of the present invention address deficiencies of the art in respect to TCP connections and provide a novel and non-obvious method, system and computer program product for facilitating management of TCP connections between two computing entities. In an embodiment of the invention, a method for managing a first TCP connection with a second computer is disclosed. The method can include maintaining the first TCP connection in an ESTABLISHED state with the second computer, wherein the first TCP connection is associated with a first set of sequence and acknowledgment numbers. The method can further include receiving a SYN message from an unidentified computer, wherein the SYN message is associated with a second set of sequence and acknowledgment numbers that don't match the first set of sequence and acknowledgment numbers. The method can further include creating a record representing a new TCP connection with the unidentified computer, wherein the new TCP connection is associated with the second set of sequence and acknowledgment numbers. The method can further include sending a SYN/ACK message to the second computer and receiving an ACK message from the second computer, wherein the ACK message is associated with a third set of sequence and acknowledgment numbers. The method can further include determining that the third set matches the first set and verifying the first TCP connection and deleting the record.

In another embodiment of the invention, a computer program product comprising a computer usable medium embodying computer usable program code for managing a first TCP connection with a second computer can be provided. The computer program product can include computer usable program code for maintaining the first TCP connection in an ESTABLISHED state with the second computer, wherein the first TCP connection is associated with a first set of sequence and acknowledgment numbers. The computer program product can further include computer usable program code for receiving a SYN message from an unidentified computer, wherein the SYN message is associated with a second set of sequence and acknowledgment numbers that don't match the first set of sequence and acknowledgment numbers. The computer program product can further include computer usable program code for creating a record representing a new TCP connection with the unidentified computer, wherein the new TCP connection is associated with the second set of sequence and acknowledgment numbers. The computer program product can further include computer usable program code for sending a SYN/ACK message to the second computer and receiving an ACK message from the second computer, wherein the ACK message is associated with a third set of sequence and acknowledgment numbers. The computer program product can further include computer usable program code for determining that the third set matches the first set and verifying the first TCP connection and deleting the record.

In another embodiment of the invention, an alternative method for managing a first TCP connection with a second computer is disclosed. The method can include maintaining the first TCP connection in an ESTABLISHED state with the second computer, wherein the first TCP connection is associated with a first set of sequence and acknowledgment numbers. The method can further include receiving a SYN message from an unidentified computer, wherein the SYN message is associated with a second set of sequence and acknowledgment numbers that don't match the first set of sequence and acknowledgment numbers. The method can further include creating a record representing a new TCP connection with the unidentified computer, wherein the new TCP connection is associated with the second set of sequence and acknowledgment numbers. The method can further include sending a SYN/ACK message to the second computer and receiving an ACK message from the second computer, wherein the ACK message is associated with a third set of sequence and acknowledgment numbers. The method can further include determining that the third set matches the second set and replacing the first TCP connection in a connection table with the new TCP connection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In an embodiment of the invention, a method for managing a first TCP connection with a second computer is disclosed.

The method can include maintaining the first TCP connection in an ESTABLISHED state with the second computer, wherein the first TCP connection is associated with a first set of sequence and acknowledgment numbers. Then, a SYN message is received from an unidentified computer, wherein the SYN message is associated with a second set of numbers that don't match the first set of numbers. Subsequently, a record representing a new TCP connection with the unidentified computer is created, wherein the new TCP connection is associated with the second set of numbers. Then, a SYN/ACK message is sent to the second computer and an ACK message is received the second computer, wherein the ACK message is associated with a third set of numbers. If the third set matches the first set, then the first TCP connection is verified and the record is deleted. If the third set matches the second set, then the first TCP connection is replaced by the new TCP connection.

Figure 1:
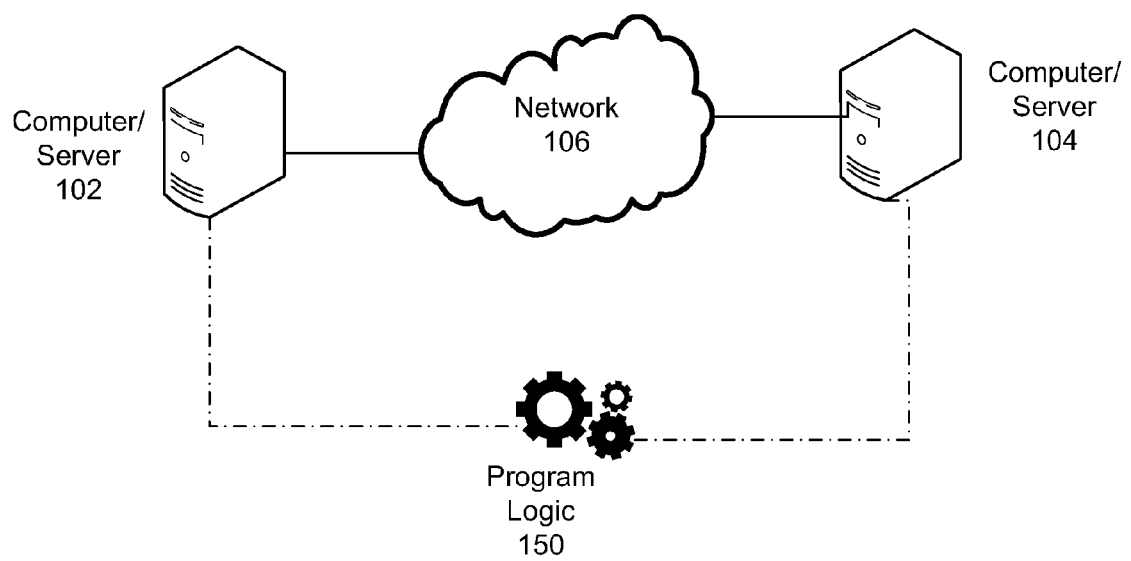
FIG. 1 is a block diagram illustrating a network architecture of a system for managing TCP connections, in accordance with one embodiment of the present invention.

Referring now to the drawing figures in which like reference designators refer to like elements, there is shown in FIG. 1 a block diagram illustrating a network architecture of a system for managing TCP connections, in accordance with one embodiment of the present invention. The exemplary embodiments of the present invention adhere to the system architecture of FIG. 1. FIG. 1 shows an embodiment of the present invention wherein computer or server 102 interacts with computer or server 104 over a network 106, such as the Internet, the World Wide Web, a WAN or a LAN. It should be noted that although FIG. 1 shows only two computers 102, 104, the system of the present invention supports any number of computers connected via network 106.

FIG. 1 shows a system whereby an application, represented by program logic 150, running on a computer 102 automatically manages a TCP connection or connections with computer 104. Program logic 150 comprises computer source code, scripting language code or interpreted language code that is compiled to produce computer instructions that perform various functions of the present invention.

As explained above, program logic 150 may reside on computer or server 102, computer or server 104 or any combination of the two. In one embodiment of the present invention, the program logic 150 is a client-server application having a client portion that resides on one computer and a server application that resides on a server.

In an embodiment of the present invention, the computer systems of computers 102, 104 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of computers 102, 104 are a server system, such as IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

Figure 2:
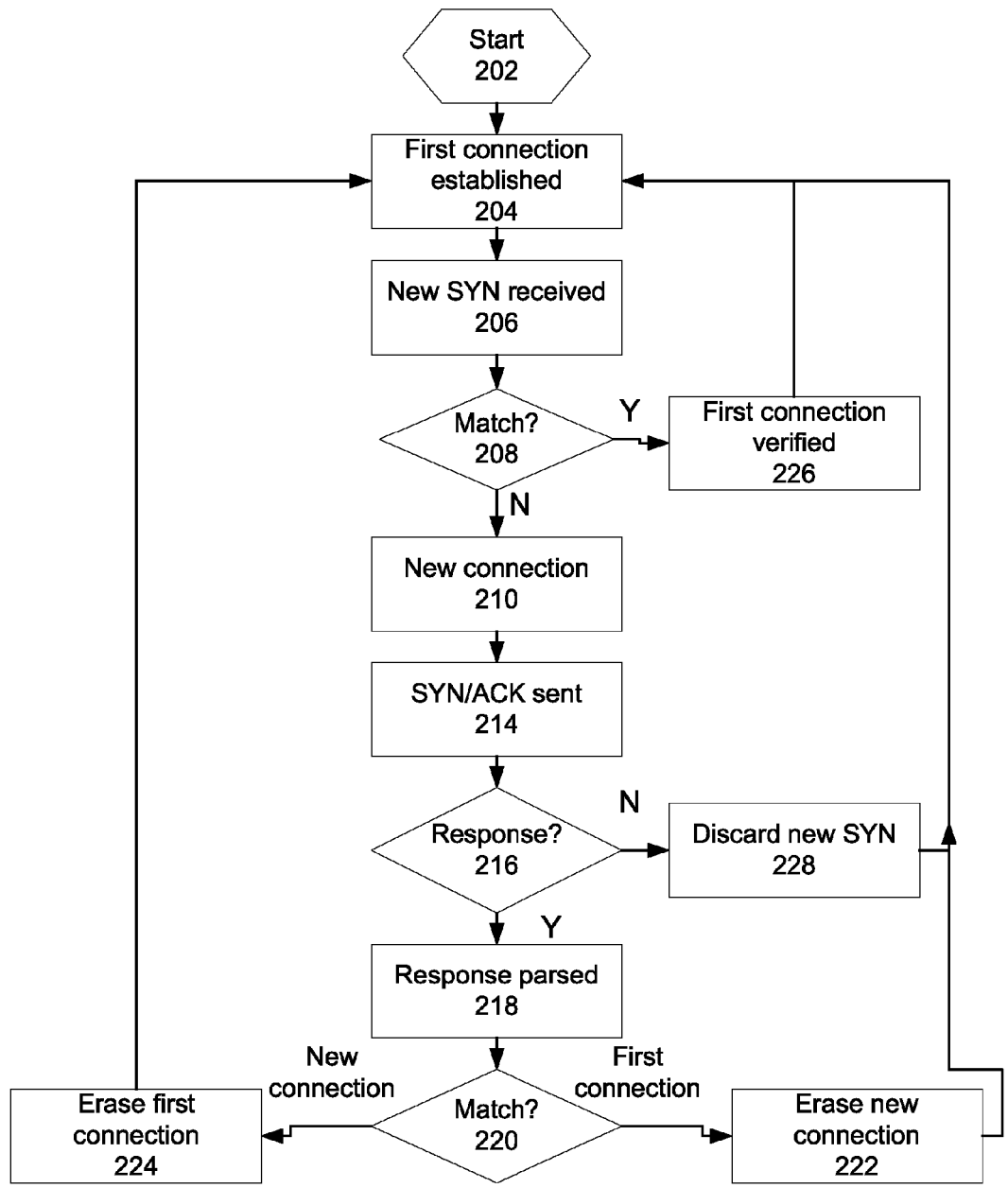
FIG. 2 is a flow chart showing the control flow of a process for managing TCP connections, in accordance with one embodiment of the present invention.

FIG. 2 is a flow chart showing the control flow of a process for managing TCP connections, in accordance with one embodiment of the present invention. FIG. 2 depicts the process executed by program logic 150 residing on a computer or server 102. Specifically, FIG. 2 depicts the process by which a single TCP connection with computer 104 is managed during reboot of the peer so as to encourage the reuse of four-tuple values and detection of an attacker. The flow chart of FIG. 2 begins with step 202 and moves directly to step 204.

In step 204, a first TCP connection between computer 102 and computer 104 exists in an ESTABLISHED state. The first TCP connection block is logged in the TCP connection table and a first set of sequence and acknowledgement numbers are associated with the first TCP connection. In step 206, a new SYN message is received from a computer of undetermined identity. A second set of sequence and acknowledgement numbers are associated with the new SYN message. In step 208, the program logic 150 determines whether the second set of sequence and acknowledgement numbers match the first set of sequence and acknowledgement numbers. If the second set of sequence and acknowledgement numbers do not match the first set of sequence and acknowledgement numbers, then control flows to step 210. If so, then control flows to step 226 wherein the first TCP connection is verified and control flows back to step 204.

In step 210, the program logic 150 creates a new TCP connection block (in a pending state) to represent a new TCP connection with the unidentified computer based on the information in the new SYN message. The new TCP connection block is not logged in the TCP connection table. Also in step 210, the new TCP connection block is anchored to the first TCP connection block. Note that at this point, the first TCP connection with the first computer continues to exist in an ESTABLISHED state and continues to be logged in the TCP connection table. Also at this point, the new TCP connection block is still not logged in the TCP connection table.

In step 214, program logic 150 responds to the new SYN message by sending a SYN-ACK message to the unidentified computer. Then, the new TCP connection block is advanced to the SYN-RECEIVED state. In step 216 it is determined whether a response to the SYN-ACK message is received from the unidentified computer within a predefined period of time. If a response to the SYN-ACK message is received from the unidentified computer within a predefined period of time, then control flows to step 218. If not, control flows to step 228 wherein the new SYN message is discarded and control flows back to step 204.

In step 218, it is determined that an ACK message has been received by the unidentified computer and it is subsequently parsed to extract a third set of sequence and acknowledgement numbers. In step 220, it is determined whether the third set of sequence and acknowledgement numbers extracted from the ACK message match either the first set of sequence and acknowledgement numbers or the second set of sequence and acknowledgement numbers. If the third set of sequence and acknowledgement numbers match the first set of sequence and acknowledgement numbers, then control flows to step 222. If the third set of sequence and acknowledgement numbers match the second set of sequence and acknowledgement numbers, then control flows to step 224.

In step 222, the new TCP connection block is deemed bogus and therefore the new TCP connection block is deleted entirely. Further, the first TCP connection block is deemed to be genuine. Subsequently, control flows back to step 204. In step 224, the first TCP connection block is deemed bogus and therefore the first TCP connection block is deleted entirely, including the corresponding entry in the TCP connection table. Further, the new TCP connection block is deemed to be genuine and it is added to the TCP connection table in place of the first TCP connection block. Subsequently, control flows back to step 204.

As explained above, the present invention is advantageous since it allows for the detection of a stale TCP connection due to various reasons, such as the reboot of the peer computer or server. The present invention is further advantageous as it allows for the reuse of four-tuples previously associated with TCP connections that are no longer valid. Additionally, the present invention allows for the detection of an attacker attempting to use or disrupt an already established TCP connection, whereby the attacker is detected using the sequence and acknowledgement numbers of a new TCP connection. The present invention allows for the seamless transition from a first TCP connection deemed bogus to a genuine second pending TCP connection that has already been established. Most notably, an already established TCP connection is not terminated until it has been deemed bogus and a second pending TCP connection is prepared for use.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for managing a first TCP connection between a first computer and a second computer, comprising:
    maintaining the first TCP connection in an ESTABLISHED state with the second computer, wherein the first TCP connection is associated with a first set of sequence and acknowledgment numbers;

receiving a SYN message from an unidentified computer, wherein the SYN message is associated with a second set of sequence and acknowledgment numbers that don't match the first set of sequence and acknowledgment numbers;

creating a record representing a new TCP connection in a PENDING state with the unidentified computer, wherein the new TCP connection is associated with the second set of sequence and acknowledgment numbers;

sending a SYN/ACK message to the unidentified computer;

advancing the new TCP connection to a SYN-RECEIVED state;

receiving an ACK message from the unidentified computer, wherein the ACK message is associated with a third set of sequence and acknowledgment numbers;

determining whether the third set matches the first set or the second set;

if the third set matches the first set, verifying the first TCP connection and deleting the record; and if the third set matches the second set, replacing the first TCP connection in a connection table with the new TCP connection.

2. The method of claim 1, wherein the sending further comprises:
   a link between the new TCP connection and the first TCP connection.

3. The method of claim 2, wherein the verifying further comprises:
   deleting the link.

4. The method of claim 1, wherein the replacing the first TCP connection further comprises:
   terminating the first TCP connection; and
   removing the first TCP connection from the connection table.

5. A computer program product comprising a computer usable storage memory having stored therein computer usable program code for managing a first TCP connection between a first computer and a second computer, the computer usable program code, which for when executed by a computer hardware system, causes the computer hardware system to perform maintaining the first TCP connection in an ESTABLISHED state with the second computer, wherein the first TCP connection is associated with a first set of sequence and acknowledgment numbers;

receiving a SYN message from an unidentified computer, wherein the SYN message is associated with a second set of sequence and acknowledgment numbers that don't match the first set of sequence and acknowledgment numbers;

creating a record representing a new TCP connection in a PENDING state with the unidentified computer, wherein the new TCP connection is associated with the second set of sequence and acknowledgment numbers;

sending a SYN/ACK message to the unidentified computer;

advancing the new TCP connection to a SYN-RECEIVED state;

receiving an ACK message from the unidentified computer, wherein the ACK message is associated with a third set of sequence and acknowledgment numbers;

determining whether the third set matches the first set or the second set;

if the third set matches the first set, verifying the first TCP connection and deleting the record; and if the third set matches the second set, replacing the first TCP connection in a connection table with the new TCP connection.

6. The computer program product of claim 5, wherein the sending further comprises:
   creating a link between the new TCP connection and the first TCP connection.

7. The computer program product of claim 6, wherein the verifying further comprises:
   deleting the link.

* * * * *